Jan. 1, 1929.
G. D. RUETZ
1,697,515
COMBINED AUTOMATIC AND MANUAL CONTROL FOR DRINK MIXERS
Filed Aug. 25, 1928
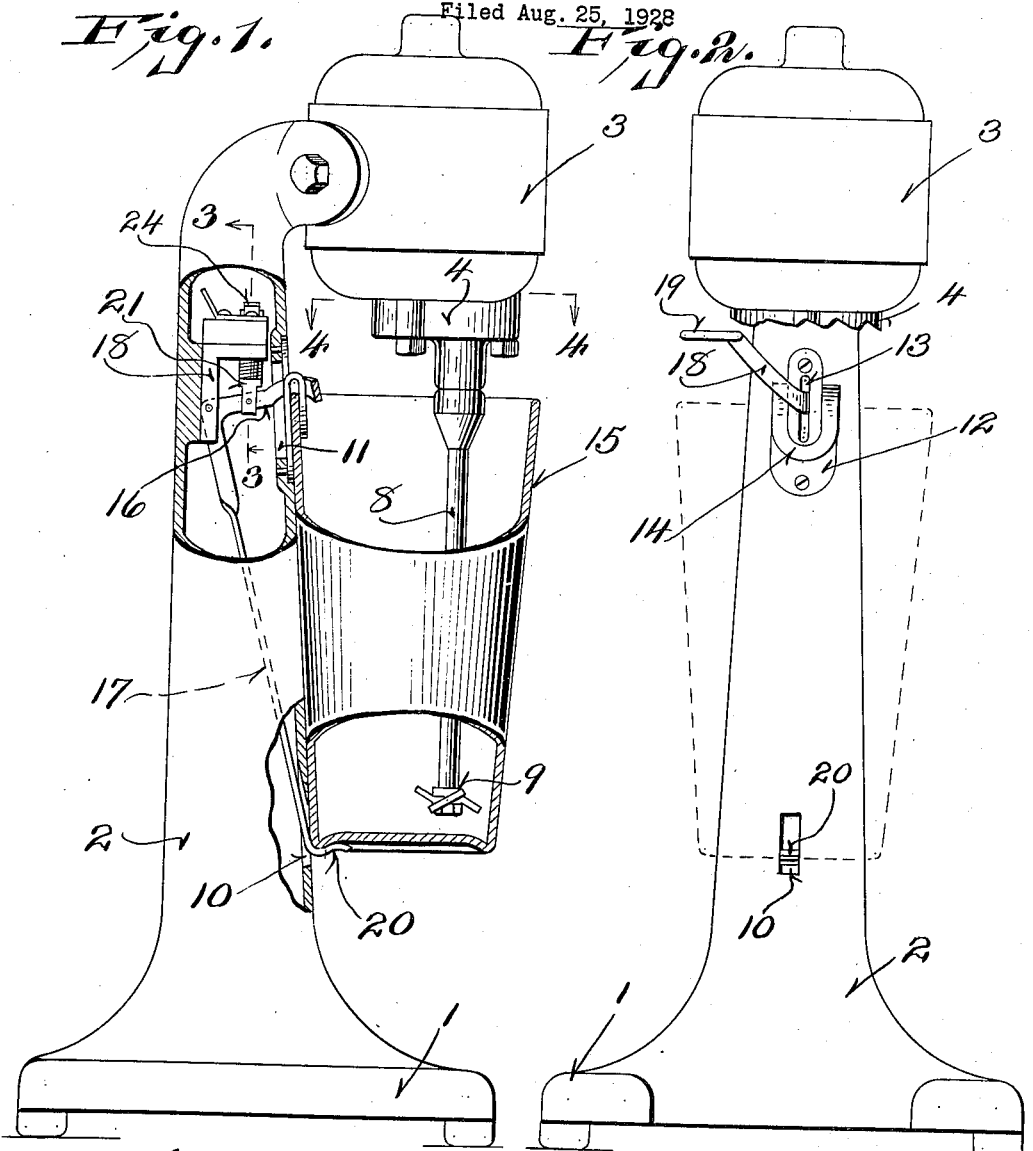
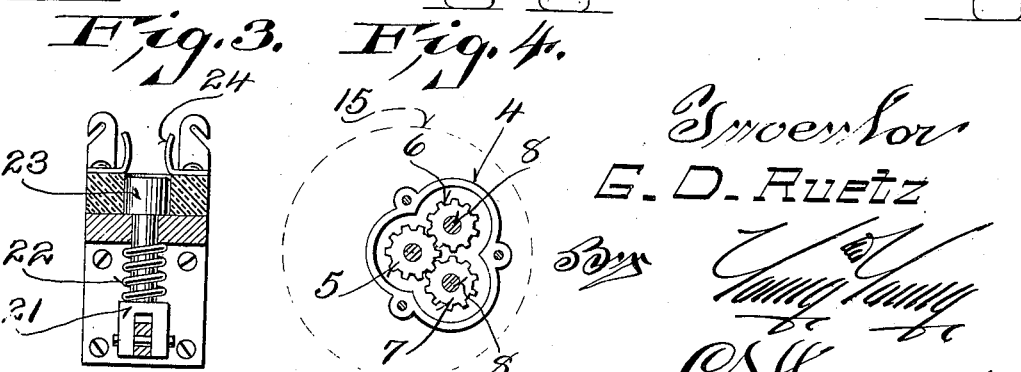
Inventor
G. D. Ruetz Patented Jan. 1, 1929.

1,697,515

UNITED STATES PATENT OFFICE.

GEORGE D. RUETZ, OF RACINE, WISCONSIN.

COMBINED AUTOMATIC AND MANUAL CONTROL FOR DRINK MIXERS.

Application filed August 25, 1928. Serial No. 302,115.

This invention relates to a combined automatic and manual control for drink mixers.

In general, this invention is an improvement over that disclosed in my co-pending application for drink mixers, filed February 23, 1928, Serial No. 256,315.

Objects of this invention are to provide a novel form of drink mixer in which there is no permanently mounted support for the container, but in which the support is rocked outwardly into position automatically by the placing of the container in position, and in which the support automatically moves out of position when the container is removed.

It is to be noted that in mixing certain drinks, it is frequently desirable to have the mixer continue in operation while the container is moved up and down. In the usual types of mixers, the beater or agitator stops as soon as the container is moved.

A further object of this invention is to provide a drink mixer in which an automatic and manual control, formed as a single unit, is provided for controlling the agitator, so that the agitator may remain in operation by the manual control, although the container is moved out of its usual position.

An embodiment of the invention is shown in the accompanying drawings in which:

Figure 1 is a side elevation partly in section showing the container in position;

Figure 2 is a view taken at right angles to Figure 1 with the container shown in dotted lines;

Figure 3 is a sectional view on the line 3—3 of Figure 1;

Figure 4 is a sectional view on the line 4—4 of Figure 1.

Referring to the drawings, it will be seen that the mixer comprises a base 1 from which a standard 2 rises. This standard has overhanging ears which carry the small electric motor 3. The electric motor casing has secured thereto a gear casing 4. This gear casing 4, as shown in Figure 4, houses three pinions 5, 6, and 7. The pinions 6 and 7 are rigidly secured to two agitators or mixer shafts 8, similar to that described in my prior application. These agitator shafts each carry a mixer or agitator 9 at its lower end.

The standard is provided with a slot 10 adjacent the lower end and with a slot 11 adjacent the upper end. Further, the standard is provided with a plate 12 inset adjacent its upper end, as shown in Figures 1 and 2, and this plate is provided with a slot 13 which aligns with a portion of the slot 11. Further, the plate is provided with a downturned hook 14 into which the upper end of the container 15 is hooked when the container is in position.

A bell crank lever having a short arm 16 and a long arm 17 is pivotally mounted upon an L-shaped block 18 secured within the standard.

Further, the short arm projects outwardly, as may be seen from Figures 1 and 2, and, as shown in Figure 2, is provided with a manually manipulable button 19.

The button 19 is provided for convenience in manually manipulating its associated lever for closing the motor circuit when the container 15 is held in manual suspension, independent of its retaining mechanism. Thus, the circuit is manually controlled by pressing the button 19 upwardly to produce the closing effect of the switch mechanism, as would be produced by the container when its edge or lip engages the lever. This short arm is adapted to be struck by the upper edge of the container when the container is positioned and as the container is shoved up into place, the long arm 17 is rocked outwardly to thereby position a support or foot 20 below the bottom of the container 15, and to thus hold the container in place against downward motion.

The short arm 18 of the bell crank lever is pivotally joined to a plunger 21 which, as may be seen from Figure 3, is downwardly pressed by means of the spring 22. The plunger carries a contact member 23 at its upper end which is adapted to bridge the stationary contacts 24, when the plunger is moved upwardly.

When using the device, all that is necessary is to slip the container into place, as shown in Figure 1. This positions the foot or support 20 beneath the container and thus holds the container in place against downward slipping. The upper end of the container is held against displacement by means of the tongue 14. The motor is automatically started from this operation, as will be apparent from the previous description, and the beating progresses in the usual manner. After the beating or mixing has been completed, the container is rocked outwardly at its lower end and slipped downwardly, thus automatically cutting off the motor and allowing the foot or support 20 to rock inwardly out of the way.

By having the foot automatically moved out of the way, it is apparent that the container may be positioned with greater ease than heretofore, as there is no lower obstruction to be avoided in positioning the container.

Further, when it is desired to move the container up or down and still keep the mixers operating it is merely necessary to hold the manually operable short lever 18 by pressing against the thumb-piece 19, thus maintaining the switch closed. The container may now be moved without stopping the operation of the motor and beaters.

It will be seen that a novel form of mixer has been provided which is of simple construction and which is so made that there is no obstructing bottom support present when the container is being positioned, but that this support is moved outwardly into supporting position when the container arrives at its uppermost position.

It will be seen further that both a manual and automatic control have been provided for the mixer so that mixing may be had although the container may be moved out of its normal position.

Although the invention has been described in considerable detail, such description is intended as illustrative rather than limiting, as the invention may be variously embodied and as the scope of such invention is to be determined as claimed.

I claim:

1. A drink mixer comprising a base, a standard projecting upwardly therefrom, an electric motor carried by the upper portion of said standard, an agitator driven by said motor, retaining means adjacent the upper portion of said standard adapted to retain the upper edge of a container, and a supporting foot normally housed within the standard and adapted to be projected outwardly by the upward motion of the container when positioning such container.

2. A drink mixer comprising a base, a standard projecting upwardly therefrom, an electric motor carried by the upper portion of said standard, mixing means driven from said motor, a hook-like member carried adjacent the upper portion of said standard and adapted to retain the upper edge of a container, a movable foot normally housed within said standard and adapted to be projected outwardly adjacent the lower portion of the container, and means carried adjacent said hook for operating said foot.

3. A drink mixer comprising a base, a standard projecting upwardly therefrom, an electric motor carried by the upper portion of said standard, mixing means driven from said motor, a hook-like member carried adjacent the upper portion of said standard and adapted to retain the upper edge of a container, a movable foot normally housed within said standard and adapted to be projected outwardly adjacent the lower portion of the container, means carried adjacent said hook for operating said foot, and a switch connected to said means for controlling said motor.

4. A drink mixer comprising a base, a standard projecting upwardly therefrom, an electric motor carried by the upper portion of said standard, mixing means driven by said motor, means carried adjacent the upper portion of said standard for retaining the upper edge of a container, a bell crank lever pivoted within said standard and having a short arm projecting outwardly adjacent the upper end of said standard and adapted to be struck by the upper edge of the container, said bell crank lever having a long arm projecting downwardly and having a supporting foot adapted to move outwardly to support the container.

5. A drink mixer comprising a base, a standard projecting upwardly therefrom, an electric motor carried by the upper portion of said standard, mixing means driven by said motor, means carried adjacent the upper portion of said standard for retaining the upper edge of a container, a bell crank lever pivoted within said standard and having a short arm projecting outwardly adjacent the upper end of said standard and adapted to be struck by the upper edge of the container, said bell crank lever having a long arm projecting downwardly and having a supporting foot adapted to move outwardly to support the container, a switch operated by said bell crank lever for controlling said motor, and manual means for operating said bell crank lever.

6. A drink mixer comprising a base, a standard projecting upwardly therefrom, an electric motor carried by said standard, mixing means driven by said motor, a switch controlling the operation of said motor a bell crank lever connected to and operating said switch, said bell crank lever having a downwardly projecting arm provided with a supporting foot adapted to be projected outwardly from said standard, said bell crank lever having a short arm projecting outwardly adjacent the upper end of said standard and adapted to be struck by said container, and a manually operable thumb-piece carried by said short arm.

In testimony that I claim the foregoing I have hereunto set my hand at Racine, in the county of Racine and State of Wisconsin.

GEORGE D. RUETZ.